United States Patent
Shi et al.

(10) Patent No.: US 11,917,608 B2
(45) Date of Patent: Feb. 27, 2024

(54) INFORMATION TRANSMISSION METHOD AND DEVICE, STORAGE MEDIUM AND ELECTRONIC DEVICE

(71) Applicant: ZTE CORPORATION, Guangdong (CN)

(72) Inventors: Jing Shi, Guangdong (CN); Shuqiang Xia, Guangdong (CN); Chunli Liang, Guangdong (CN); Xianghui Han, Guangdong (CN); Min Ren, Guangdong (CN); Wei Lin, Guangdong (CN)

(73) Assignee: ZTE CORPORATION

( * ) Notice: Subject to any disclaimer, the term of this patent is extended or adjusted under 35 U.S.C. 154(b) by 272 days.

(21) Appl. No.: 17/048,310

(22) PCT Filed: Apr. 12, 2019

(86) PCT No.: PCT/CN2019/082480
§ 371 (c)(1),
(2) Date: Oct. 16, 2020

(87) PCT Pub. No.: WO2019/201174
PCT Pub. Date: Oct. 24, 2019

(65) Prior Publication Data
US 2021/0153227 A1     May 20, 2021

(30) Foreign Application Priority Data

Apr. 18, 2018   (CN) .......................... 201810350983.X

(51) Int. Cl.
H04W 72/1263  (2023.01)
H04L 1/1812   (2023.01)
(Continued)

(52) U.S. Cl.
CPC ....... *H04W 72/1263* (2013.01); *H04L 1/1819* (2013.01); *H04L 5/1469* (2013.01); *H04W 72/0446* (2013.01); *H04W 72/51* (2023.01)

(58) Field of Classification Search
CPC ......... H04W 72/1263; H04W 72/0446; H04W 72/048; H04L 1/1819; H04L 5/1469
See application file for complete search history.

(56) References Cited

U.S. PATENT DOCUMENTS

2019/0021072 A1 *  1/2019  Horiuchi ............... H04L 5/0055
2019/0268096 A1 *  8/2019  Takeda ................. H04L 7/0334
(Continued)

FOREIGN PATENT DOCUMENTS

CN   106664168   5/2017
CN   106788930   5/2017
(Continued)

OTHER PUBLICATIONS

Ericsson: "RAN1 decisions for WI Shortened TTI and processing time for LTE (LTE_sTTIandPT)", 3GPP Draft; R1-183173. Athens, Greece. 2018.
(Continued)

*Primary Examiner* — Michael Thier
*Assistant Examiner* — Nevena Zecevic Sandhu
(74) *Attorney, Agent, or Firm* — McDonald Hopkins LLC

(57) ABSTRACT

Provided are an information transmission method and apparatus, a storage medium and an electronic apparatus. The method includes the following step: a PDSCH traffic with a length of a second TTI is received after an error of receiving a PDSCH traffic with a length of a first TTI is made; where a first transmission unit is supported in the first TTI, a second transmission unit and a third transmission unit are supported in the second TTI, and a transmission unit of the second TTI corresponds to a transmission unit of the first TTI.

7 Claims, 2 Drawing Sheets

(51) Int. Cl.
    *H04L 5/14*     (2006.01)
    *H04W 72/0446*     (2023.01)
    *H04W 72/51*     (2023.01)

(56) References Cited

U.S. PATENT DOCUMENTS

2019/0356426 A1* 11/2019 He ................ H04W 72/042
2021/0410094 A1* 12/2021 Cui ................ H04W 56/0055

FOREIGN PATENT DOCUMENTS

| CN | 107371269 | 11/2017 |
| CN | 107852265 | 3/2018 |
| CN | 108604958 | 9/2018 |
| EP | 3249845 A1 | 11/2017 |

OTHER PUBLICATIONS

Supplementary Partial European Search Report for U.S. Appl. No. 19/787,985, PCT/CN2019/082480, dated Dec. 10, 2021, 22 pgs., European Patent Office, Germany.
Qualcomm, "Aspects related to Interaction between different TTI lengths," 3GPP Draft; R1-1804901, Apr. 2018, XP051427164, China.
Samsung, "CB-group based retransmission for eMBB," 3GPP Draft; R1-1702990, Feb. 12, 2017, XP051210132, Greece.
Zte, "HARQ processes sharing between 1ms TTI and sTTI," 3GPP Draft; R1-1712320, Aug. 21, 2017, XP051315136, Czech Republic.
Huawei et al., "TTI switching between sTTI and Legacy TTI," 3GPP Draft; R2-1708554, Aug. 20, 2017, XP051318406, Germany.
Qualcomm, "Corrections for supporting two TBs in case of sTTI-to-TTI dynamic switching," 3GPP Draft; R1-1805406, Apr. 19, 2018, XP051427732, China.
Huawei, "MAC impact of HARQ process sharing between TTI and sTTI," 3GPP Draft; R2-1710396, Oct. 13, 2017, Czech Republic.
Ericsson, "Design aspects of sPDSCH, " 3GPP Draft; R1-1708865, May 19, 2017, China.
3GPP TS 36.212 V15.1.0, 3GPP, "Technical Specification Group Radio Access Network." Mar. 2018.
3GPP TS 36.302 V13.3.0, 3GPP, "Technical Specification Group Radio Access Network." Sep. 2016.
LG Electronics, "Dynamic switching between 1ms TTI and sTTI," 3GPP Draft; R1-1713066, Aug. 25, 2017, Czech Republic.
Qualcomm Incorporated, "Aspects related to the dynamic switching between 1ms TTI and sTTI," 3GPP Draft; R1-1712776, Aug. 25, 2017, Czech Republic.
Huawei, "TTI Switching between sTTI and Legacy TTI," 3GPP Draft; R2-1701885, Feb. 17, 2017, Greece.
Japan Patent Office, Notice of Reasons for Refusal, Japanese Application No. 2020-557197, drafted Nov. 29, 2021, Fourth Examination Department, Japan.
Ericsson: "RAN1 decisions for WI Shortened TTI and processing time for LTE (LTE_sTTIandPT)", 3GPP Draft; R1-1803173. Athens, Greece. 2018.
Ericsson. "R1-1803174, RAN1 Decisions for WI Shortened TTI and Processing Time for LTE (LTE_sTTIandPT)-per Topic" 3GPP TSG RAN WG1 Meeting #92, Mar. 6, 2018, section 3.4.1.
Patent Cooperation Treaty (PCT), International Search Report and Written Opinion for Application PCT/CN2019/082480 filed on Apr. 12, 2019, dated Jul. 8, 2019, International Searching Authority, CN.
Chinese Office Action dated May 7, 2022; Chinese Patent Application No. 201810350983.X, filed on Apr. 18, 2018.
Chinese Supplemental Search Report; Chinese Patent Application No. 201810350983.X, filed on Apr. 18, 2018.
Korean Office Action dated May 12, 2022; Korean Patent Application No. 10-2020-7033127, filed on Nov. 17, 2020.
Ericsson. R1-1719246, "RAN1 decisions for WI Shortened TTI and processing time for LTE," 3GPP TSG RAN WG1 #90bis, 3GPP (2017).
State Intellectual Property Office of People's Republic of China, Notification of First Office Action for Application No. 201810350983, report issue date Sep. 28, 2021, China.
State Intellectual Property Office of People's Republic of China, Notification of First Search Report for Application No. 201810350983, China.
Korean Patent Office, Notification of Reason for Refusal for Application No. 10-2020-7033127, report issue date Oct. 29, 2021, Korea.
Australian Patent Office, Examination Report No. 1 for Application No. 2019254220, report issue date Jun. 23, 2021.

* cited by examiner

Receive a PDSCH traffic with a length of a second TTI after an error of receiving a PDSCH traffic with a length of a first TTI is made — S202

INFORMATION TRANSMISSION METHOD AND DEVICE, STORAGE MEDIUM AND ELECTRONIC DEVICE

This application is a 35 U.S.C. 371 national stage filing of PCT Application No. PCT/CN2019/082480, filed on Apr. 12, 2019, which claims priority to a Chinese patent application No. 201810350983.X filed Apr. 18, 2018, the disclosure of which are incorporated herein by reference in their entireties.

TECHNICAL FIELD

The present application relates to the field of communications and, for example, to an information transmission method and apparatus, a storage medium and an electronic apparatus.

BACKGROUND

At present, the 4th Generation (4G) mobile communication technology Long-Term Evolution (LTE)/Long-Term Evolution Advance (LTE-Advance/LTE-A) and the 5th Generation (5G) mobile communication technology are facing increasing requirements. From the current development trend, for both 4G and 5G systems, the characteristics that support enhanced mobile broadband, ultra-high reliability, ultra-low latency transmission and massive connections are studied.

In the related art, in the case where traffics with different transmission time intervals are allowed to share processes, and a traffic with a relatively short transmission time interval supports at most one transmission block/codeword, a traffic with a relatively long transmission time interval supports at most two transmission blocks/codewords. However, in the related art, it still cannot be determined that which of the two transmission blocks corresponds to the one transmission block supported by the traffic with the short transmission time interval before switching.

In view of the above, no effective scheme has yet been proposed.

SUMMARY

Embodiments of the present application provide an information transmission method and apparatus, a storage medium and an electronic apparatus.

According to an embodiment of the present application, an information transmission method is provided and includes the following step: a physical downlink shared channel (PDSCH) traffic with a length of a second transmission time interval (TTI) is received after an error of receiving a PDSCH traffic with a length of a first TTI is made; where a first transmission unit is supported in the first TTI, a second transmission unit and a third transmission unit are supported in the second TTI, and a transmission unit of the second TTI corresponds to a transmission unit of the first TTI.

According to an embodiment of the present application, an information transmission method is provided and includes the following step: in the case where a user equipment (UE) is configured with a short processing time and a length of a TTI is one subframe under an uplink/downlink subframe configuration 6 and a special subframe configuration 10 in a time division duplexing (TDD) system, all downlink subframes and all special subframes of the UE support scheduling physical uplink shared channels (PUSCHs) in at most two different subframes.

According to an embodiment of the present application, an information transmission method is provided and includes the following step: in the case where a TTI configured for a UE is a slot under an uplink/downlink subframe configuration 0 or 6 in a TDD system, all downlink subframes and all special subframes of the UE support scheduling PUSCHs in multiple different slots.

According to another embodiment of the present application, an information transmission apparatus is provided and includes a transmission module. The transmission module is configured to receive a PDSCH traffic with a length of a second TTI after an error of receiving a PDSCH traffic with a length of a first TTI is made; where a first transmission unit is supported in the first TTI, a second transmission unit and a third transmission unit are supported in the second TTI, and a transmission unit of the second TTI corresponds to a transmission unit of the first TTI.

According to another embodiment of the present application, an information transmission apparatus is provided and includes a configuration module. The configuration module is configured to that, in the case where a UE is configured with a short processing time and a length of a TTI is one subframe under an uplink/downlink subframe configuration 6 and a special subframe configuration 10 in a TDD system, all downlink subframes and all special subframes of the UE support scheduling PUSCHs in at most two different subframes.

According to another embodiment of the present application, an information transmission apparatus is provided and includes a configuration module. The configuration module is configured to that, in the case where a TTI configured for a UE is a slot under an uplink/downlink subframe configuration 0 or 6 in a TDD system, all downlink subframes and all special subframes of the UE support scheduling PUSCHs in multiple different slots.

According to another embodiment of the present application, a storage medium is further provided. The storage medium is configured to store a computer program, where the computer program is configured to, when executed, perform the step in any above-mentioned method embodiment.

According to another embodiment of the present application, an electronic apparatus is further provided. The electronic apparatus includes a memory and a processor. The memory is configured to store a computer program and the processor is configured to execute the computer program to perform the step in any above-mentioned method embodiment.

BRIEF DESCRIPTION OF DRAWINGS

The drawings described herein are used for providing a further understanding of the present application and forming a part of the present application. The exemplary embodiments and descriptions thereof in the present application are used for explaining the present application and not to limit the present application in any improper way. In the drawings.

DETAILED DESCRIPTION

Hereinafter, the present application will be described in detail with reference to drawings and in conjunction with embodiments.

It is to be noted that the terms such as "first" and "second" in the description, claims and drawings of the present application are used for distinguishing between similar objects and are not necessarily used for describing a particular order or sequence.

Embodiment One

Figures 1, 2:
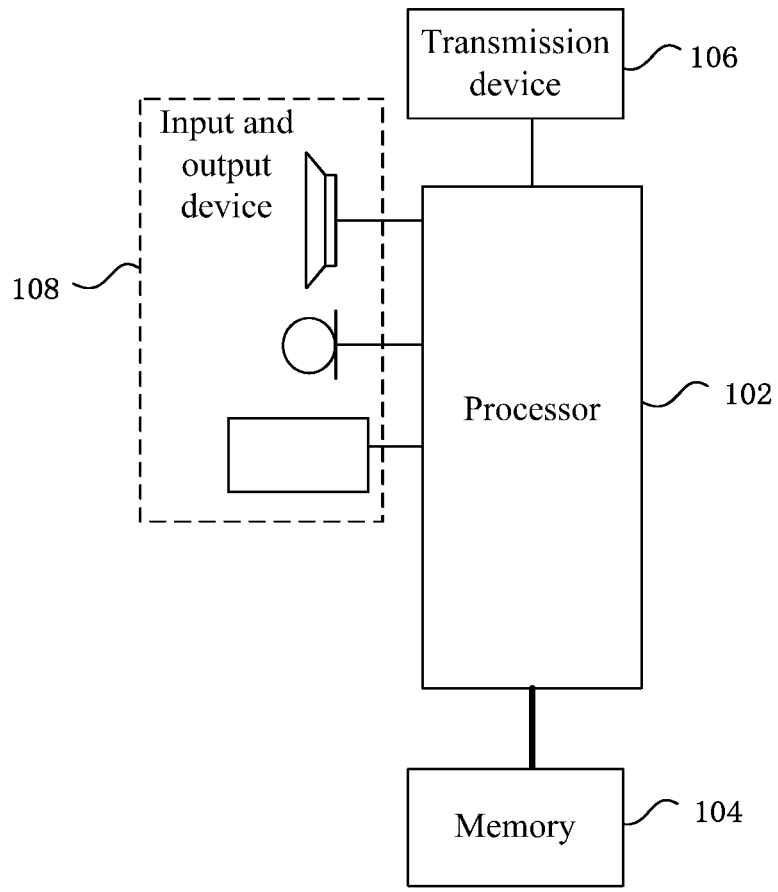
FIG. 1 is a block diagram of a hardware structure of a mobile terminal for an information transmission method according to an embodiment of the present application.
FIG. 2 is a flowchart of an information transmission method according to an embodiment of the present application.

A method embodiment provided in embodiment one of the present application may be executed in a mobile terminal, a computer terminal or other similar computing apparatuses. Taking the method embodiment being executed in the mobile terminal as an example, FIG. 1 is a block diagram of a hardware structure of a mobile terminal for an information transmission method according to an embodiment of the present application. As shown in FIG. 1, a mobile terminal 10 may include one or more (only one is shown in FIG. 1) processors 102 (the processor 102 may include, but is not limited to, a processing apparatus such as a microcontroller unit (MCU) or a field programmable gate array (FPGA)), a memory 104 used for storing data. In an embodiment, the above-mentioned mobile terminal may further include a transmission device 106 for a communication function and an input and output device 108. It is to be understood by those of ordinary skill in the art that the structure shown in FIG. 1 is merely illustrative and not intended to limit the structure of the above-mentioned mobile terminal. For example, the mobile terminal 10 may further include more or fewer components than the components shown in FIG. 1, or may have a configuration different from the configuration shown in FIG. 1.

The memory 104 may be configured to store a computer program, such as a software program and a module of an application, or a computer program corresponding to the information transmission method in the embodiment of the present application. The processor 102 executes the computer program stored in the memory 104 to perform various functional applications and data processing, that is, to perform the above-mentioned method. The memory 104 may include a high-speed random access memory, or may further include a nonvolatile memory, such as one or more magnetic storage apparatuses, flash memories or other nonvolatile solid-state memories. In some examples, the memory 104 may further include memories that are remotely disposed relative to the processor 102. These remote memories may be connected to the mobile terminal 10 via a network. Examples of the above-mentioned network include, but are not limited to, the Internet, an intranet, a local area network, a mobile communication network and a combination thereof.

The transmission device 106 is configured to receive or send data via a network. Specific examples of the above-mentioned network may include a wireless network provided by a communication provider of the mobile terminal 10. In an example, the transmission device 106 includes a network interface controller (NIC). The NIC may be connected to other network devices via a base station and thus communicates with the Internet. In an example, the transmission device 106 may be a radio frequency (RF) module, which is configured to communicate with the Internet in a wireless way.

This embodiment provides an information transmission method executed on the above-mentioned mobile terminal. FIG. 2 is a flowchart of an information transmission method according to an embodiment of the present application. As shown in FIG. 2, the process includes step S202 described below.

In step S202, a PDSCH traffic with a length of a second TTI is received after an error of receiving a PDSCH traffic with a length of a first TTI is made.

A first transmission unit is supported in the first TTI, a second transmission unit and a third transmission unit are supported in the second TTI, and a transmission unit of the second TTI corresponds to a transmission unit of the first TTI.

According to the above-mentioned step, a predefined corresponding relation between the retransmitted two transmission units and the transmission unit before switching the TTI length is determined, such that an unambiguous transmission between a base station and a terminal side can be achieved, it is ensured that the base station and the terminal side can accurately determine a corresponding relation between a retransmission transport block (TB) and an initial transmission TB in the same process, it is ensured that the correctness of hybrid automatic retransmission request (HARQ) merging. Therefore, the defect that the transport block cannot be determined after switching a transmission time interval in a retransmission in the related art is overcame.

In an embodiment, the above-mentioned step may, but may not necessarily, be executed by a terminal and a UE, such as a mobile phone.

In this embodiment, duration of the first transmission time interval is less than duration of the second transmission time interval, and a transmission unit (e.g., the first transmission unit, the second transmission unit, and the third transmission unit) may be a TB or a codeword, which corresponds to four possibilities: a first transport block and a second/third transport block; a first codeword and a second/third codeword; the first transport block and the second/third codeword; the first codeword and the second/third transport block.

In an embodiment, a corresponding relation between the transmission unit of the second TTI and the transmission unit of the first TTI may be set in a predefined manner.

In an embodiment, a communication system to which the present embodiment is applicable includes multiple types of communication systems and is not limited to 4G or 5G systems. Taking a 4G LTE system as an example, a relatively short transmission time interval (the first TTI) is a short transmission time interval, i.e., a short TTI, and the length of the TTI is a subslot or slot. A relatively long transmission time interval (the second TTI) is a subframe, and the length of the TTI is 1 ms. Taking a 5G new radio (NR) system as an example, a relatively short transmission time interval is a mini-slot, that is, the length of the TTI is two orthogonal frequency division multiplexing (OFDM) symbols or four OFDM symbols or seven OFDM symbols. A relatively long transmission time interval is a slot, that is, the length of the TTI is fourteen OFDM symbols (a normal cyclic prefix (CP)). The embodiment below is illustrated from the perspective of a 4G system, but is not limited to the 4G system. For the same transmission time interval, it may also be applicable in the case where the initial transmission supports only one TB but the retransmission supports two TBs. The first TTI includes one of the following: a subslot, a slot or a mini-slot, and the second TTI includes one of the following: a subframe or a slot. The subslot in the first TTI is a TTI including 2/3 OFDM symbol (OS), the slot is 0.5 ms and includes seven OFDM symbols, and the mini-slot includes two or four or seven OFDM symbols. The subframe in the second TTI is 1 ms and includes fourteen OFDM symbols, and the slot is 1 ms and includes fourteen OFDM symbols.

In an embodiment, the transmission unit of the second TTI corresponding to the transmission unit of the first TTI may include, but is not limited to, the cases described below.

The second transmission unit corresponds to the first transmission unit.

The third transmission unit corresponds to the first transmission unit.

The second transmission unit and the third transmission unit correspond to the first transmission unit.

In the case where a codeword swap flag is 0, the second transmission unit corresponds to the first transmission unit; in the case where a codeword swap flag is 1, the third transmission unit corresponds to the first transmission unit.

In the case where a process number of the first TTI is M, the second transmission unit corresponds to the first transmission unit, where 0≤M≤7.

In the case where a process number of the first TTI is N, the third transmission unit corresponds to the first transmission unit, where 8≤N≤15.

Another information transmission method executed on the above-mentioned mobile terminal is provided in this embodiment and includes the following step: in the case where a UE is configured with a short processing time and a length of a TTI is one subframe under an uplink/downlink subframe configuration 6 and a special subframe configuration 10 in a TDD system, all downlink subframes and all special subframes of the UE support scheduling PUSCHs in at most two different subframes.

Another information transmission method executed on the above-mentioned mobile terminal is provided in this embodiment and includes the following step: in the case where a TTI configured for a UE is a slot under an uplink/downlink subframe configuration 0 or 6 in a TDD system, all downlink subframes and all special subframes of the UE support scheduling PUSCHs in multiple different slots.

From the description of the preceding embodiments, it is apparent to those skilled in the art that the methods in the preceding embodiments may be implemented by software plus a necessary general-purpose hardware platform, or may of course be implemented by hardware. However, in many cases, the former is a preferred implementation. Based on this understanding, the technical scheme in the present application substantially, or the part contributing to the related art, may be embodied in the form of a software product. The computer software product is stored on a storage medium (such as a read-only memory (ROM)/ random access memory (RAM), a magnetic disk or an optical disk) and includes several instructions for enabling a terminal device (which may be a mobile phone, a computer, a server or a network device) to perform the method of each embodiment of the present application.

Embodiment Two

The embodiment further provides an information transmission apparatus. The apparatus is configured for implementing the above-mentioned embodiments and preferred implementation modes. What has been described will not be repeated. As used below, the term "module" may be at least one of software, hardware or a combination thereof capable of implementing predetermined functions. The apparatuses in the embodiment described below are preferably implemented by software, but an implementation by hardware or by a combination of software and hardware is also possible and conceived.

Figure 3:
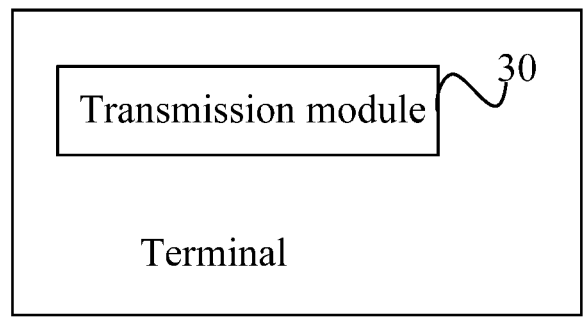
FIG. 3 is a structural block diagram of an information transmission apparatus according to an embodiment of the present application.

FIG. 3 is a structural block diagram of an information transmission apparatus according to an embodiment of the present application. As shown in FIG. 3, the apparatus includes: a transmission module 30.

The transmission module 30 is configured to receive a PDSCH traffic with a length of a second TTI after an error of receiving a PDSCH traffic with a length of a first TTI is made; where a first transmission unit is supported in the first TTI, a second transmission unit and a third transmission unit are supported in the second TTI, and a transmission unit of the second TTI corresponds to a transmission unit of the first TTI.

Another information transmission apparatus is further provided in the embodiment and includes a configuration module. The configuration module is configured to that, in the case where a UE is configured with a short processing time and a length of a TTI is one subframe under an uplink/downlink subframe configuration 6 and a special subframe configuration 10 in a TDD system, all downlink subframes and all special subframes of the UE support scheduling PUSCHs in at most two different subframes.

Another information transmission apparatus is further provided in the embodiment and includes a configuration module. The configuration module is configured to that, in the case where a TTI configured for a UE is a slot under an uplink/downlink subframe configuration 0 or 6 in a TDD system, all downlink subframes and all special subframes of the UE support scheduling PUSCHs in multiple different slots.

It is to be noted that the modules described above may be implemented by software or hardware. An implementation by hardware may, but not necessarily, be performed in the following manner: the modules are located in the same processor or the modules are located in their respective processors in any combination.

Embodiment Three

In the case where traffics with different transmission time intervals are allowed to share processes in a communication system, and a traffic with a relatively short transmission time interval supports at most one transmission block/codeword, a traffic with a relatively long transmission time interval supports at most two transmission blocks/codewords. This embodiment overcomes a defect of how to determine to use a transport block after switching a transmission time interval in a retransmission.

This embodiment further includes multiple implementation modes for describing the present application in detail in conjunction with different scenarios.

Implementation Mode 1

A terminal receives a short TTI PDSCH, using a transmission time interval of a subslot or a transmission time interval of a slot, where a process number is X, X≥0, and X is an integer, and using a downlink control information (DCI) format supporting at most one transport block, such as at least one of DCI formats 7-1A/7-1B/7-1C/7-1D/7-1E/7-1F/7-1G. After the first transmission fails, a retransmission is performed and a length of a TTI is switched. A TTI of 1 ms is used, and the process number is X. At this time, at most two transport blocks are supported, and a DCI format supporting at most two transport blocks, such as at least one of DCI formats 2/2A/2B/2C/2D, is used, where TB1 or codeword 0 corresponds to the retransmission of the previous short TTI PDSCH, a new data indication (NDI) is not toggled, and TB2 or codeword 1 (if any) is an inserted another transport block, for example, the another transport block is a new TB.

In the information transmission method of this implementation mode, a predefined corresponding relation between only one of the retransmitted two TBs and the TB before switching the length of the TTI is determined, such that an unambiguous transmission between the base station and the terminal side can be achieved, it is ensured that the base station and the terminal side can accurately determine a corresponding relation between a retransmission TB and an initial transmission TB in the same process, and it is ensured that the correctness of HARQ merging.

Implementation Mode 2

A terminal receives a short TTI PDSCH, using a transmission time interval of a subslot or a transmission time interval of a slot, where a process number is X, X≥0, and X is an integer, and using a DCI format supporting at most one transport block, such as at least one of DCI formats 7-1A/7-1B/7-1C/7-1D/7-1E/7-1F/7-1G. After the first transmission fails, a retransmission is performed and a length of a TTI is switched. A TTI of 1 ms is used, and the process number is X. At this time, at most two transport blocks are supported, and a DCI format supporting at most two transport blocks, such as at least one of DCI formats 2/2A/2B/2C/2D, is used, where TB2 or codeword 1 corresponds to the retransmission of the previous short TTI PDSCH, an NDI is not toggled, and TB1 or codeword 0 is an inserted another transport block, for example, the another transport block is a new TB.

In the information transmission method of this implementation mode, a predefined corresponding relation between only one of the retransmitted two TBs and the TB before switching the length of the TTI is determined, such that an unambiguous transmission between the base station and the terminal side can be achieved, it is ensured that the base station and the terminal side can accurately determine a corresponding relation between a retransmission TB and an initial transmission TB in the same process, and it is ensured that the correctness of HARQ merging.

Implementation Mode 3

A terminal receives a short TTI PDSCH, using a transmission time interval of a subslot or a transmission time interval of a slot, where a process number is X, X≥0, and X is an integer, and using a DCI format supporting at most one transport block, such as at least one of DCI formats 7-1A/7-1B/7-1C/7-1D/7-1E/7-1F/7-1G. After the first transmission fails, a retransmission is performed and a length of a TTI is switched. A TTI of 1 ms is used, and the process number is X. At this time, at most two transport blocks are supported, and a DCI format supporting at most two transport blocks, such as at least one of DCI formats 2/2A/2B/2C/2D, is used, where both TB1 and TB2 correspond to the retransmission of the previous short TTI PDSCH, and an NDI of the TB1 and an NDI of TB2 are not toggled. In an embodiment, different redundancy versions (RVs) are used for the TB1 and the TB2.

In the information transmission method of this implementation mode, a predefined corresponding relation between the retransmitted two TBs and the TB before switching the length of the TTI is determined, such that an unambiguous transmission between the base station and the terminal side can be achieved, it is ensured that the base station and the terminal side can accurately determine a corresponding relation between a retransmission TB and an initial transmission TB in the same process, and it is ensured that the correctness of HARQ merging.

Implementation Mode 4

A terminal receives a short TTI PDSCH, using a transmission time interval of a subslot or a transmission time interval of a slot, where a process number is X, 0≤X≤15, and X is an integer, and using a DCI format supporting at most one transport block, such as at least one of DCI formats 7-1A/7-1B/7-1C/7-1D/7-1E/7-1F/7-1G. After the first transmission fails, a retransmission is performed and a length of a TTI is switched. A TTI of 1 ms is used. At this time, at most two transport blocks are supported, and a DCI format supporting at most two transport blocks, such as at least one of DCI formats 2/2A/2B/2C/2D, is used. In the case where a process number is X and 0≤X≤7, TB1 or codeword 0 corresponds to the retransmission of the previous short TTI PDSCH, and an NDI is not toggled; in the case where the process number is X-8 and 8≤X≤15, TB2 or codeword 1 corresponds to the retransmission of the previous short TTI PDSCH, and the NDI is not toggled. In an embodiment, another transport block is a new TB.

In the information transmission method of this implementation mode, a predefined corresponding relation between only one of the retransmitted two TBs and the TB before switching the length of the TTI is determined, such that an unambiguous transmission between the base station and the terminal side can be achieved, it is ensured that the base station and the terminal side can accurately determine a corresponding relation between a retransmission TB and an initial transmission TB in the same process, and it is ensured that the correctness of HARQ merging.

Implementation Mode 5

A terminal receives a short TTI PDSCH, using a transmission time interval of a subslot or a transmission time interval of a slot, where a process number is X, X≥0, and X is an integer, and using a DCI format supporting at most one transport block, such as at least one of DCI formats 7-1A/7-1B/7-1C/7-1D/7-1E/7-1F/7-1G. After the first transmission fails, a retransmission is performed and a length of a TTI is switched. A TTI of 1 ms is used, and the process number is X. At this time, at most two transport blocks are supported, and a DCI format supporting at most two transport blocks, such as at least one of DCI formats 2/2A, is used. In the case where a transport block to codeword swap flag is 0, TB1 is in codeword 0, then the TB1 corresponds to the retransmission of the previous short TTI PDSCH, an NDI is not toggled; and TB2 (if any) is an inserted another transport block, for example, the another transport block is a new TB. In the case where the transport block to codeword swap flag is 1, the TB2 is in the codeword 0, then the TB2 corresponds to the retransmission of the previous short TTI PDSCH, the NDI is not toggled, and the TB1 is an inserted another transport block, for example, the another transport block is a new TB.

In the information transmission method of this implementation, a predefined corresponding relation between only one of the retransmitted two TBs and the TB before switching the length of the TTI is determined, such that an unambiguous transmission between the base station and the terminal side can be achieved, it is ensured that the base station and the terminal side can accurately determine a corresponding relation between a retransmission TB and an initial transmission TB in the same process, and it is ensured that the correctness of HARQ merging.

Implementation Mode 6

In the case where a UE is configured with a short processing time under an uplink/downlink configuration 6 and a special subframe configuration 10 in a TDD system, that is, the minimum n+3 TTI processing time is supported, and a TTI is one subframe, it is supported that an uplink (UL) index is introduced for all downlink subframes or all special subframes, and an index of a subframe where the scheduled PUSCH is located is separately indicated by a most significant bit (MSB) and a least significant bit (LSB) in 2 bits. In an embodiment, as shown in Table 1, for each subframe scheduling, a PUSCH in a subframe with specified timing before the diagonal line or a PUSCH in the subframe with specified timing after the diagonal line is scheduled separately through 2 bits in a UL index. Taking subframe n=5 as an example, in the case of MSB=1, a PUSCH in subframe n+3, that is, a PUSCH in subframe 8, is scheduled. In the case of LSB=1, a PUSCH in subframe n+6, that is, a PUSCH in subframe 1, is scheduled.

Table 1 is used for illustrating the scheduling timing for uplink/downlink (UL/DL) grant to the PUSCH for the configuration 6 and the special subframe configuration (SSC) 10 in the TDD.

TABLE 1

| TDD UL/DL configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 6, SSC 10 | 3/4 | 5/6 | | | | 3/6 | 5/6 | | | 3/4 |

Other exemplarily tables are shown in Tables 2 to 5.

TABLE 2

| TDD UL/DL configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 6, SSC 10 | 3/4 | 5/6 | | | | 3/6 | 5/6 | | | 3/5 |

TABLE 3

| TDD UL/DL configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 6, SSC 10 | 3/4 | 5/6 | | | | 3/6 | 5/6 | | | 3/7 |

TABLE 4

| TDD UL/DL configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 6, SSC 10 | 3/4 | 5/6 | | | | 3/7 | 5/7 | | | 3/5 |

TABLE 5

| TDD UL/DL configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 6, SSC 10 | 3/4 | 5/6 | | | | 3/7 | 5/7 | | | 3/7 |

According to the method for determining scheduling timing in this embodiment, all downlink subframes and all special subframes can flexibly schedule PUSCHs in at most two different subframes, and downlink control overhead can be balanced in all downlink subframes and all special subframes.

Implementation Mode 7-1

In the case where a UE is configured with a short TTI under an uplink/downlink configuration 0 in a TDD system, the transmission interval is in slots, and the transmitted PUSCH is called as a slot-PUSCH. In order to support that all uplink slots or all special subframes may be scheduled, a UL index is introduced, and an index of a slot where the scheduled PUSCH is located is separately indicated through an MSB and an LSB in 2 bits. In an embodiment, as shown in Table 6, in the case where an SSC includes 1, 2, 3, 4, 6, 7, 8, the scheduling of the slot PUSCH is achieved by setting 2 bits information in the UL index as follows.

In the case of (MSB, LSB)='01', a PUSCH in slot n+k is scheduled in slot n, where the value of k is shown in Table 6.

In the case of (MSB, LSB)='10', a PUSCH in slot n+k+1 is scheduled the slot n, where the value of k is shown in Table 6.

In the case of (MSB, LSB)='11', the PUSCH in the slot n+k and the PUSCH in the slot n+k+1 are scheduled in the slot n, where the value of k is shown in Table 6.

TABLE 6

| TDD UL/DL Configuration | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0, (SSC 1, 2, 3, 4, 6, 7, 8) | 4 | 4 | 4 | 5 | | | | | | | 4 | 4 | 4 | 5 | | | | | | |

Slot n = 2 is taken as an example for description.

In the case of (MSB, LSB)='01', a PUSCH in slot n+4, that is, a PUSCH in slot 6, is scheduled.

In the case of (MSB, LSB)='10', a PUSCH in slot n+4+1, that is, a PUSCH in slot 7, is scheduled.

In the case of (MSB, LSB)='11', the PUSCH in the slot n+4 and the PUSCH in the slot n+4+1, that is, the PUSCH in the slot 6 and the PUSCH in the slot 7, are scheduled.

Implementation Mode 7-2

In the case where a UE is configured with a short TTI under an uplink/downlink configuration 0 in a TDD system, the transmission interval is in slots, and the transmitted PUSCH is called as a slot-PUSCH. In order to support that all uplink slots or all special subframes may be scheduled, a UL index is introduced, an index of a slot where the scheduled PUSCH is located is separately indicated through an MSB and an LSB in 2 bits. In an embodiment, as shown in Table 7, in the case where an SSC includes 0, 5, 9, the scheduling of the slot PUSCH is achieved by setting 2 bits information in the UL index as follows.

In the case of (MSB, LSB)='01', a PUSCH in slot n+k is scheduled in slot n, where the value of k is shown in Table 7.

In the case of (MSB, LSB)='10', a PUSCH in slot n+k+1 is scheduled in the slot n, where the value of k is shown in Table 7.

In the case of (MSB, LSB)='11', the PUSCH in the slot n+k and the PUSCH in the slot n+k+1 are scheduled in the slot n, where the value of k is shown in Table 7.

special subframes may be scheduled, a UL index is introduced, and an index of a slot where the scheduled PUSCH is located is separately indicated through an MSB and an LSB in 2 bits. In an embodiment, as shown in Table 8, in the case of the special subframe configuration 10, the scheduling of the slot PUSCH is achieved by setting 2 bits information in the UL index as follows.

For other slots in addition to slot 2 and slot 12:
   in the case of (MSB, LSB)='01', a PUSCH in slot n+k is scheduled in slot n, where the value of k is shown in Table 8;
   in the case of (MSB, LSB)='10', a PUSCH in slot n+k+1 is scheduled in the slot n, where the value of k is shown in Table 8;
   in the case of (MSB, LSB)='11', the PUSCH in the slot n+k and the PUSCH in the slot n+k+1 are scheduled in the slot n, where the value of k is shown in Table 8.

For the slot 2 and the slot 12:
   in the case of (MSB, LSB)='01', a PUSCH in slot n+k is scheduled in slot n, where the value of k is shown in Table 8;
   in the case of (MSB, LSB)='10', a PUSCH in slot n+k+1 is scheduled in the slot n, where the value of k is shown in Table 8;

TABLE 7

| TDD UL/DL Configuration | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0(SSC 0, 5, 9) | | 4 | 5 | 6 | | | | | | | | | 4 | 5 | 6 | | | | | |

Slot n = 1 is taken as an example for description.

In the case of (MSB, LSB)='01', a PUSCH in slot n+5, that is, a PUSCH in slot 6, is scheduled.

In the case of (MSB, LSB)='10', a PUSCH in slot n+5+1, that is, a PUSCH in slot 7, is scheduled.

In the case of (MSB, LSB)='11', the PUSCH in the slot n+5 and the PUSCH in the slot n+5+1, that is, the PUSCH in the slot 6 and the PUSCH in the slot 7, are scheduled.

in the case of (MSB, LSB)='11', a PUSCH in slot n+k+5 is scheduled in the slot n, where the value of k is shown in Table 8;

in the case of (MSB, LSB)='00', the PUSCH in the slot n+k, the PUSCH in the slot n+k+1 and the PUSCH in the slot n+k+5 are scheduled in the slot n, where the value of k is shown in Table 8.

TABLE 8

| TDD UL/DL Configuration | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0(SSC 10) | | 4 | 5 | 6 | | | | | | | | | 4 | 5 | 6 | | | | | |

Slot n = 1 is taken as an example for description.

Implementation Mode 7-3

In the case where a UE is configured with a short TTI under an uplink/downlink configuration 0, the transmission interval is in slots, and the transmitted PUSCH is called as a slot-PUSCH. In order to support that all uplink slots or all In the case of (MSB, LSB)='01', a PUSCH in slot n+5, that is, a PUSCH in slot 6, is scheduled.

In the case of (MSB, LSB)='10', a PUSCH in slot n+5+1, that is, a PUSCH in slot 7, is scheduled.

In the case of (MSB, LSB)='11', the PUSCH in the slot n+5 and the PUCSH in the slot n+5+1, that is, the PUSCH in the slot 6 and the PUSCH in the slot 7, are scheduled.

According to the method for determining scheduling timing in this embodiment, all downlink subframes and all special subframes may flexibly schedule PUSCHs in two or more different slots, and downlink control overhead can be balanced in all downlink slots and all special subframes.

Implementation Mode 8-1

In the case where a UE is configured with a short TTI under an uplink/downlink configuration 6 in a TDD system, the transmission interval is in slots, and the transmitted PUSCH is called as a slot-PUSCH. In order to support that all uplink slots or all special subframes may be scheduled a UL index is introduced, and an index of a slot where the scheduled PUSCH is located is separately indicated through an MSB and an LSB in 2 bits. In an embodiment, as shown in Table 9, in the case where the special subframe configuration includes 1, 2, 3, 4, 6, 7, 8, the scheduling of the slot PUSCH is achieved by setting 2 bits information in the UL index as follows.

For other slots other than slot 3 and slot 13:
  in the case of (MSB, LSB)='01', a PUSCH in slot n+k is scheduled in slot n, where the value of k is shown in Table 9;
  in the case of (MSB, LSB)='10', a PUSCH in slot n+k+1 is scheduled in the slot n, where the value of k is shown in Table 9;
  in the case of (MSB, LSB)='11', the PUSCH in the slot n+k and the PUSCH in the slot n+k+1 are scheduled in the slot n, where the value of k is shown in Table 9.
For the slot 3 and the slot 13, a PUSCH in slot n+k is scheduled in slot n, where the value of k is shown in Table 9.

TABLE 9

| TDD UL/DL Configuration | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 6, (SSC 1, 2, 3, 4, 6, 7, 8) | 6 | 6 | 6 | 6 | | | | | | | 4 | 4 | 4 | 4 | | | | | 6 | 6 |

Slot n = 2 is taken as an example for description.

In the case of (MSB, LSB)='01', a PUSCH in slot n+6, that is, a PUSCH in slot 8, is scheduled.
In the case of (MSB, LSB)='10', a PUSCH in slot n+6+1, that is, a PUSCH in slot 9, is scheduled.
In the case of (MSB, LSB)='11', the PUSCH in the slot n+6 and the PUSCH in the slot n+6+1, that is, the PUSCH in the slot 8 and the PUSCH in the slot 9, are scheduled.

Implementation Mode 8-2

In the case where a UE is configured with a short TTI under an uplink/downlink configuration 6 in a TDD system, the transmission interval is in slots, and the transmitted PUSCH is called as a slot-PUSCH. In order to support that all uplink slots or all special subframes may be scheduled, a UL index is introduced, and an index of a slot where the scheduled PUSCH is located is separately indicated through an MSB and an LSB in 2 bits. In an embodiment, as shown in Table 10, in the case where the special subframe configuration includes 0, 5, 9, the scheduling of the slot PUSCH is achieved by setting 2 bits information in the UL index as follows.

In the case of (MSB, LSB)='01', a PUSCH in slot n+k is scheduled in slot n, where the value of k is shown in Table 10.
In the case of (MSB, LSB)='10', a PUSCH in slot n+k+1 is scheduled in the slot n, where the value of k is shown in Table 10.
In the case of (MSB, LSB)='11', the PUSCH in the slot n+k and the PUSCH in the slot n+k+1 are scheduled in the slot n, where the value of k is shown in Table 10.

TABLE 10

| TDD UL/DL Configuration | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 6(SSC 0, 5, 9) | 4 | 5 | 6 | | | | | | | | | | 4 | 4 | 4 | | | | | |

Slot n = 2 is taken as an example for description.

In the case of (MSB, LSB)='01', a PUSCH in slot n+6, that is, a PUSCH in slot 8, is scheduled.
In the case of (MSB, LSB)='10', a PUSCH in slot n+6+1, that is, a PUSCH in slot 9, is scheduled.
In the case of (MSB, LSB)='11', the PUSCH in the slot n+6 and the PUSCH in the slot n+6+1, that is, the PUSCH in the slot 8 and the PUSCH in the slot 9, are scheduled.

Implementation Mode 8-3

In the case where a UE is configured with a short TTI under an uplink/downlink configuration 6 in a TDD system, the transmission interval is in slots, and the transmitted PUSCH is called as a slot-PUSCH. In order to support that all uplink slots or all special subframes may be scheduled, a UL index is introduced, an index of a slot where the scheduled PUSCH is located is separately indicated through an MSB and an LSB in 2 bits. In an embodiment, as shown in Table 11, in the case of the special subframe configuration 10, the scheduling of the slot PUSCH is achieved by setting 2 bits information in the UL index as follows.

For other slots in addition to slot 2:
  in the case of (MSB, LSB)='01', a PUSCH in slot n+k is scheduled in slot n, where the value of k is shown in Table 11;
  in the case of (MSB, LSB)='10', a PUSCH in slot n+k+1 is scheduled in the slot n, where the value of k is shown in Table 11;
  in the case of (MSB, LSB)='11', the PUSCH in the slot n+k and the PUSCH in the slot n+k+1 are scheduled in the slot n, where the value of k is shown in Table 11.

For the slot 2:
  in the case of (MSB, LSB)='01', a PUSCH in slot n+k is scheduled in slot n, where the value of k is shown in Table 11;
  in the case of (MSB, LSB)='10', a PUSCH in slot n+k+1 is scheduled in the slot n, where the value of k is shown in Table 11;
  in the case of (MSB, LSB)='11', a PUSCH in slot n+k+5 is scheduled in the slot n, where the value of k is shown in Table 11;
  in the case of (MSB, LSB)='00', the PUSCH in the slot n+k, the PUSCH in the slot n+k+1 and the PUSCH in the slot n+k+5 are scheduled in the slot n, where the value of k is shown in Table 11.

TABLE 11

| TDD UL/DL Configuration | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0(SSC 10) | | 4 | 5 | 6 | | | | | | | 4 | 4 | 4 | | | | | | | 4 |

Slot n = 1 is taken as an example for description.

In the case of (MSB, LSB)='01', a PUSCH in slot n+5, that is, a PUSCH in slot 6, is scheduled.

In the case of (MSB, LSB)='10', a PUSCH in slot n+5+1, that is, a PUSCH in slot 7, is scheduled.

In the case of (MSB, LSB)='11', the PUSCH in the slot n+5 and the PUSCH in the slot n+5+1, that is, the PUSCH in the slot 6 and the PUSCH in the slot 7, are scheduled.

According to the method for determining scheduling timing in this embodiment, all downlink subframes and all special subframes may flexibly schedule PUSCHs in two or more different slots, and downlink control overhead can be balanced in all downlink slots and all special subframes.

Embodiment Four

The embodiment of the present application further provides a storage medium. The storage medium is configured to store a computer program. The computer program is configured to, when executed, perform the steps of any one of the preceding method embodiments.

In an embodiment, the storage medium may be configured to store a computer program for performing step S1 described below.

In step S1, a PDSCH traffic with a length of a second TTI is received after an error of receiving a PDSCH traffic with a length of a first TTI is made; where a first transmission unit is supported in the first TTI, a second transmission unit and a third transmission unit are supported in the second TTI, and a transmission unit of the second TTI corresponds to a transmission unit of the first TTI.

In an embodiment, the storage medium may include, but is not limited to, a universal serial bus (USB) flash disk, an ROM, an RAM, a mobile hard disk, a magnetic disk, an optical disk or another medium capable of storing computer programs.

An embodiment of the present application further provides an electronic apparatus, and the electronic apparatus includes a memory and a processor. The memory is configured to store a computer program and the processor is configured to execute the computer program to perform the steps of any one of the preceding method embodiments.

In an embodiment, the electronic apparatus may further include a transmission device and an input and output device. The transmission device is connected to the processor. The input and output device is connected to the processor.

In an embodiment, the processor may be configured to execute step S1 described below through the computer program.

In step S1, a PDSCH traffic with a length of a second TTI is received after an error of receiving a PDSCH traffic with a length of a first TTI is made; where a first transmission unit is supported in the first TTI, a second transmission unit and a third transmission unit are supported in the second TTI, and a transmission unit of the second TTI corresponds to a transmission unit of the first TTI.

In an embodiment, for specific examples in the present embodiment, reference may be made to the examples described in the preceding embodiments and optional implementation modes, and repetition is not made in this embodiment.

Apparently, those skilled in the art should understand that the above-mentioned modules or steps of the present application may be implemented by a general-purpose computing apparatus, the modules or steps may be concentrated on a single computing apparatus or distributed on a network formed by multiple computing apparatuses, and in an embodiment, the modules or steps may be implemented by program codes executable by the computing apparatuses, so that the modules or steps may be stored in a storage apparatus and executed by the computing apparatuses. In some cases, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any particular combination of hardware and software.

What is claimed is:

1. An information transmission method, comprising:
  retransmitting a physical downlink shared channel (PDSCH) traffic with a length of a second transmission time interval (TTI) after an initial transmission of the PDSCH traffic with a length of a first TTI fails, wherein duration of the first TTI is less than duration of the second TTI;
  wherein a first transmission unit is supported in the first TTI, a second transmission unit and a third transmission unit are supported in the second TTI, and a transmission unit of the second TTI corresponds to a transmission unit of the first TTI; and
  wherein the transmission unit of the second TTI corresponding to the transmission unit of the first TTI comprises that: when the first TTI is a subslot-level TTI, the first transmission unit supported in the first TTI is a transport block, the second TTI is a subframe-level TTI, the second transmission unit and the third transmission unit supported in the second TTI are codeword 0 and codeword 1, respectively, the codeword 0 in the subframe-level TTI for retransmitting the PDSCH traffic corresponds to the transport block in the subslot-level TTI for the initial transmission of the PDSCH traffic in a predefined manner.

2. The method of claim 1, wherein the transmission unit of the second TTI corresponding to the transmission unit of the first TTI comprises one of the following that:

the second transmission unit corresponds to the first transmission unit;

the third transmission unit corresponds to the first transmission unit; or the second transmission unit and the third transmission unit correspond to the first transmission unit.

3. The method of claim 1, wherein the first TTI comprises one of a subslot, a slot or a mini-slot, the second TTI comprises one of a subframe or a slot.

4. The method of claim 1, wherein the transmission unit of the second TTI corresponding to the transmission unit of the first TTI comprises that:

in a case where a codeword swap flag is 0, the second transmission unit corresponds to the first transmission unit;

in a case where the codeword swap flag is 1, the third transmission unit corresponds to the first transmission unit.

5. The method of claim 1, wherein the transmission unit of the second TTI corresponding to the transmission unit of the first TTI comprises that:

in a case where a process number of the first TTI for the initial transmission of the PDSCH traffic is M, the second transmission unit supported in the second TTI for retransmitting the PDSCH traffic corresponds to the first transmission unit supported in the first TTI for the initial transmission of the PDSCH traffic in a predefined manner, wherein $0 \leq M \leq 7$;

in a case where the process number of the first TTI for the initial transmission of the PDSCH traffic is N, the third transmission unit supported in the second TTI for retransmitting the PDSCH traffic corresponds to the first transmission unit supported in the first TTI for the initial transmission of the PDSCH traffic in a predefined manner, wherein $8 \leq N \leq 15$.

6. A non-transitory storage medium, storing a computer program, wherein the computer program is configured to, when executed, perform the method of claim 1.

7. An electronic apparatus, comprising a memory and a processor, wherein the memory is configured to store a computer program, and the processor is configured to execute the computer program to perform the method of claim 1.

* * * * *